United States Patent

Molock et al.

[11] Patent Number: 5,938,795
[45] Date of Patent: Aug. 17, 1999

[54] METHOD FOR PREPARING TINTED CONTACT LENS

[75] Inventors: Frank F. Molock; James D. Ford, both of Orange Park, Fla.

[73] Assignee: Johnson & Johnson Vision Products, Inc., Jacksonville, Fla.

[21] Appl. No.: 08/402,410

[22] Filed: Mar. 10, 1995

Related U.S. Application Data

[63] Continuation of application No. 07/966,232, Oct. 26, 1992, abandoned.

[51] Int. Cl.[6] ............................................. D06P 5/00
[52] U.S. Cl. .................................. 8/507; 8/509; 8/549
[58] Field of Search .......................... 8/507, 509, 549; 351/160 H, 162

[56] References Cited

U.S. PATENT DOCUMENTS

| | | | |
|---|---|---|---|
| 4,157,892 | 6/1979 | Tanaka et al. | 8/507 |
| 4,252,421 | 2/1981 | Foley | 351/162 |
| 4,468,229 | 8/1984 | Su | 8/307 |
| 4,553,975 | 11/1985 | Su | 8/507 |
| 4,559,059 | 12/1985 | Su | 8/507 |
| 4,639,105 | 1/1987 | Neefe | 351/162 |
| 4,640,805 | 2/1987 | Neefe | 264/1.1 |
| 4,668,240 | 5/1987 | Loshaek | 8/507 |
| 4,680,336 | 7/1987 | Larsen et al. | 524/548 |
| 4,857,072 | 8/1989 | Narducy et al. | 8/507 |
| 4,891,046 | 1/1990 | Wittmann et al. | 8/507 |
| 4,929,250 | 5/1990 | Hung et al. | 8/507 |
| 4,954,132 | 9/1990 | Hung et al. | 8/507 |
| 4,963,159 | 10/1990 | Narducy et al. | 8/507 |
| 4,963,160 | 10/1990 | Hung et al. | 8/507 |
| 5,021,068 | 6/1991 | Hung et al. | 8/507 |
| 5,098,445 | 3/1992 | Hung et al. | 8/507 |
| 5,151,106 | 9/1992 | Bhaumik et al. | 8/507 |
| 5,292,350 | 3/1994 | Molock et al. | 8/507 |

FOREIGN PATENT DOCUMENTS

| | | | |
|---|---|---|---|
| 0 396 376 | 11/1990 | European Pat. Off. | C09B 69/10 |

*Primary Examiner*—Caroline D. Liott

[57] ABSTRACT

An improved method for imparting a tint or color to a soft, hydrogel contact lens by uniformly dispersing a dye throughout the lens. The dye is a water-soluble halotriazine dye. The dye is reacted with a hydrophilic monomer to prepare a reactive dye containing predominantly monofunctionality. The monomer is then subjected to polymerization in the presence of a homogeneous solution of the reactive dye in the monomer under conditions to yield the hydrophilic polymer from which the lens is formed. The dye becomes bonded to the polymer during polymerization. The finished lens does not require soaking in an aqueous solution of the dye to impart the desired tint or color to the lens. Additionally, the dye uniformly dispersed throughout the lens according to the improved method does not leach out of the lens or migrate within the lens. Furthermore, the lens does not need to be washed with aqueous base to bond the dye to the lens.

15 Claims, No Drawings

METHOD FOR PREPARING TINTED CONTACT LENS

This is a continuation of application Ser. No. 07/966,232, filed Oct. 26, 1992, now abandoned.

BACKGROUND OF THE INVENTION

This invention relates to a method for imparting color to a contact lens. More specifically, it relates to an improved method for uniformly dispersing a dye throughout a soft, hydrogel contact lens.

The conventional method for imparting an evenly dispersed tint in a soft contact lens is described, for example, in U.S. Pat. No. 4,468,229. Generally, the lens is first soaked in an aqueous solution of the dye, and then the dye is bonded to the lens in a separate solution. The lens is typically composed of a hydrophilic polymer derived from the polymerization of hydrophilic monomers. The bonding of the dye to the lens is carried out by contacting the soaked lens with an aqueous base prior to the final hydration step, which is intended to provide the soft, hydrogel lens with the desired amount of water at an acceptable pH.

The dyes which are used in the conventional method are typically derived from a halotriazine such as a dihalotriazine or monohalotriazine, especially water-soluble dichlorotriazines. Dichlorotriazine or monohalotriazine dyes that carry sulfonate functionalities, for example, are soluble in water, so it is necessary that bonding occur with the hydrophilic polymer from which the lens is composed before the final hydration step. Otherwise, the dye could migrate within the lens to create an uneven dispersion, or leach out from the lens into the eye of the wearer.

The dye which imparts the tint to a soft lens made using the conventional method not only is dispersed in the lens, but also does not migrate within the lens or leach out of the lens after the bond has formed. The tinted lens is also stable in an aqueous medium and after repeated high temperature cycling, conditions which are present during routine wear and cleaning. The conventional method requires that the lens be soaked in a solution containing the dye which is at a specific concentration, and at a specific conductivity, so that the dye diffuses into the polymer. The conductivity is important since one may control the swelling of a lens by selecting various salt concentrations. It is also important that the dye concentration and time the lens stays in the dye soak be precisely controlled since the diffusion kinetics determine the intensity of the tinted contact lens. The conventional method employs a high concentration of dye in the dye wash so that the continuous tinting can be managed. Unfortunately, this method is cumbersome and requires multiple steps, especially at commercial scale production, because it is necessary to soak the lens in a solution of the dye at a specific concentration and time to create a dispersion of the dye in the lens. Therefore, because of this difficulty, alternative methods have been sought.

U.S. Pat. No. 4,157,892 discloses adding a functionality to the polymer from which the lens is derived which is reactive with the dye. The functionalized polymer is prepared by reacting a "coupler monomer" with a conventional hydrophilic monomer. This coupler monomer has a high probability of changing the physical properties of the polymer. The lens prepared from the functionalized polymer is immersed in a solution of a diazonium dye, where the dye then bonds to the polymer. Although adequate bonding occurs, this method still requires immersion of the finished lens in a solution of the dye.

Another interesting method for imparting color to a soft lens is disclosed in U.S. Pat. No. 4,640,805. This patent describes preparing a tinted lens using a conventional spin casting technique. A suspension of dye pigment in liquid monomer is applied to the mold surface prior to polymerization of bulk monomer in the spin cast mold. Although this method provides a simple way for imparting color to the surface of the lens, it does require that the mold be stamped or printed with specific geometries and spacing.

Attempts have been made to incorporate the dye in the lens by polymerizing the hydrophilic monomer from which the lens is derived in the presence of the dye. For example, U.S. Pat. No. 4,252,421 discloses polymerizing a hydrophilic monomer in the presence of a water-insoluble phthalocyanine dye. The dye is supposed to become entrapped in the finished, hydrated lens because of its incompatibility with water. Unfortunately, the dye will leach out of a lens derived from polymerizing the most commonly used hydrophilic monomer, hydroxyethylmethacrylate (HEMA), when the lens is fully hydrated to greater than about 40 weight percent water. This is even more of a problem with higher water content materials.

The '421 patent also discloses functionalizing the dye with a polymerizable vinyl group, and then subsequently bonding the functionalized dye during polymerization of the monomers from which the lens is derived. Although this eliminates the need for a post-bonding step, the water content of the lens is adversely affected unless hydrophilic —$SO_3H$ or —$SO_3Na$ groups are added to the phthalocyanine dye nucleus (as discussed at column 8 of the patent). This simply adds another burdensome step in the manufacturing process to make a contact lens suitable for extended wear applications.

In a similar manner, European Patent Application 0 396 376 discloses the use of a non-charged anthraquinone dye which is functionalized with a polymerizable group to facilitate bonding of the functionalized dye during polymerization of the hydrophilic monomer. Unfortunately, the non-charged dye leads to lower water solubility, if any at all, which in turn restricts the concentration of the dye which can be present in the lens. More importantly, however, the functionalized anthraquinone dye is by necessity a difunctional dye in this case. This difunctionality creates in effect a dye which is a crosslinker. As a result, the water content of the lens is further lowered, and lenses made with this difunctional dye are unacceptably brittle when the concentration of the dye in the lens is increased.

Finally, another attempt to impart color to a contact lens is disclosed in U.S. Pat. No. 4,639,105. This patent discloses spin casting a mixture of liquid monomer, soluble dye and pigment particles to prepare a lens with variations in color achieved by migration of the pigment particles during spin casting. Although this patent indicates that the dyes do not migrate, no reference is made of what specific dyes are used, and it is believed that such dyes will indeed migrate or leach during wear unless the dye used is functionalized with polymerizable groups as described above. Furthermore, such a lens is unsuitable for those applications where a uniform dispersion of dye or colorant is necessary or desired.

In view of the deficiencies of the prior art, a method of uniformly dispersing a water-soluble dye throughout a soft contact lens, without requiring the step of immersing the finished lens in a solution of the dye, is needed. Additionally, such a method would be extremely desirable if it could be used to prepare a tinted contact lens with physical and optical properties which substantially equal those of a conventional untinted lens. Specifically, a tinted contact lens with a water content and flexibility equivalent to those of a conventional untinted lens is needed.

SUMMARY OF THE INVENTION

The invention is an improved method for preparing a soft, hydrogel contact lens which has a dye dispersed substantially uniformly throughout the lens. The invention is an improvement of the conventional method of preparing such a lens, in which the lens is derived from the polymerization of a hydrophilic monomer and the lens is dyed with a coloringly effective amount of a water-soluble halotriazine dye. The improvement comprises reacting the dye with the hydrophilic monomer prior to polymerizing the monomer. The reaction occurs, under conditions effective to prepare a reactive dye which is predominantly a monofunctional dye. The hydrophilic monomer is then polymerized in the presence of a homogeneous solution of the reactive dye in the monomer.

The improved method of this invention eliminates the need to immerse the lens in an aqueous solution of the dye after polymerization of the hydrophilic monomer from which the finished lens is derived. Additionally, it is unnecessary to bond the dye to the lens after the lens is formed. This is so because the monofunctional dye reacts with, and bonds to, the polymer backbone of the lens. Therefore, it is unnecessary to wash the lens with large volumes of aqueous base to bond the dye to the lens.

The dye is uniformly dispersed throughout the lens, and it does not leach out of the lens into the eye of the wearer or migrate within the lens to create an uneven dispersion of the dye in the lens. In addition, the amount of dye necessary to achieve the desired degree of tinting of the lens is significantly less than the amount necessary when the finished lens is soaked in a solution of the dye according to conventional methods.

The intensity of the tint in the lens can be controlled accurately depending on the concentration of the monofunctional dye in the hydrophilic monomer. This contrasts with the conventional method, which requires precise control of not only the concentration of the dye in the aqueous soaking solution, but also the soaking time for the lens in the aqueous solution.

Furthermore, the physical and optical properties of the tinted lens are essentially equivalent to the physical and optical properties of a corresponding lens without the incorporation of the dye. For example, handling characteristics, wearer comfort, and lens clarity are not sacrificed when the dye is incorporated into the lens using the improved method of this invention. Most significantly, the water-soluble nature of the dye, and the fact that it does not act as a crosslinking agent because of its predominant monofunctionality, allows for the incorporation of increased amounts of the dye in the lens without sacrificing the water content and handling characteristics, e.g. flexibility, of the lens.

DETAILED DESCRIPTION OF THE INVENTION

The preferred class of halotriazine dyes are dihalotriazine dyes, especially dichlorotriazine dyes with at least one sulfonate functionality to render the dye water-soluble. Such dichlorotriazine dyes are described, for example, in U.S. Pat. Nos. 4,559,059 and 4,891,046, each of which is incorporated by reference herein. The most preferred dichlorotriazine dye is Color Index Reactive Blue 4. Monochlorotriazine dyes with at least one sulfonate functionality such as Reactive Blue #2 can also be incorporated into the lens material. The water soluble dyes which can be utilized in addition to Color Index Reactive Blue 4 include Procion Blue MRS; Fiber Reactive Brilliant Blue MRS; 2-anthracenesulfonic acid, 1-amino-4-(3-((4,6-dichloro-s-triazin-2-yl)amino)-4-sulfoanilino)-9,10-dihydro-9,10-dioxo, disodium salt; 2-anthracenesulfonic acid, 1-amino-4-(3-((4,6-dichloro-1,3,5-triazin-2-yl)amino)-4-sulfophenyl)amino)-9,10-dihydro-9,10-dioxo-, disodium salt; and 2-anthracenesulfonic acid, 1-amino-4-(3-((4,6-dichloro-s-triazin-2-yl)amino)-4-sulfoanilino)-9,10-dihydro-9,10-dioxo.

The conditions for reacting the water soluble halotriazine dye with the hydrophilic monomer in order to prepare a predominantly monofunctional dye will depend on the specific monomer chosen and the type of halotriazine dye used. These conditions can readily be determined empirically.

The reactive dye is "predominantly" monofunctional if as a result of the reaction not less than 50 percent of the active dye compounds formed have only one site of reactive functionality derived from the reaction of the dye with the hydrophilic monomer. If more than 50 percent of the active dye compounds were difunctional, then the dye would act as a crosslinker which may adversely affect the physical properties of the finished lens. Preferably, not less than 80 percent of the active dye compounds are monofunctional. Ideally, at least 95 percent of the dye is monofunctional.

The reaction of the dye with the monomer advantageously occurs in the presence of an organic Lewis base solvent which is capable of solubilizing the monomer and the dye. The reaction can be driven faster to completion if an equimolar or molar excess of the monomer is added to the reaction mixture. The reaction temperature is preferably raised above room temperature, e.g. 35–70° C., for about 16 to 32 hours. When the reaction is complete, the mixture is preferably neutralized to a pH of between 5–8. Any excess reactants, solvent and byproducts can be removed from the reactive dye compounds using conventional methods.

The Lewis base solvent acts as an inert diluent for the reaction between the monomer and the dye. Examples of suitable solvents include pyridine, tetrahydrofuran (THF), and dimethylsulfoxide (DMSO). However, the preferred solvent is an aqueous base, preferably an alkali or alkaline earth metal carbonate, or phosphate.

As used herein, a soft hydrogel contact lens refers to a gel-like lens derived from polymerizing a monomeric composition containing a hydrophilic monomer. A hydrophilic monomer refers to any monomer which, when polymerized, yields a hydrophilic polymer capable of forming a hydrogel when contacted with water. Examples of hydrophilic monomers include, but are not limited to, hydroxy esters of acrylic or methacrylic acid, N,N dimethylacryamide (DMA), N-vinyl pyrrolidone (NVP), and styrene sulfonic acid, and other hydrophilic monomers known in the art. The subsequently formed polymeric lens is swollen with a significant amount of water to form the hydrogel lens, typically greater than 30 percent and preferably at least 65 percent water.

The preferred hydrophilic monomer is a hydroxy ester of acrylic or methacrylic acid. Examples of hydroxy esters of acrylic and methacrylic acid include, but are not limited to, hydroxyethylmethacrylate (HEMA) hydroxyethylacrylate (HEA), glycerylmethacrylate, hydroxypropylmethacrylate, hydroxypropylacrylate and hydroxytrimethyleneacrylate. The most preferred hydroxy ester of acrylic or methacrylic acid is HEMA, which is the monomer most commonly used in the preparation of soft hydrogel contact lenses.

The hydrophilic monomer is preferably copolymerized with comonomers in a monomer reaction mixture to impart specific improvements in chemical and physical properties, depending on the particular application desired. For example, the equilibrium water content of the lens can be increased if methacrylic acid (MAA) is used as a comonomer. Additionally, polyfunctional crosslinking monomers, such as ethylene glycol dimethacrylate (EGDMA) and trimethylolpropane trimethacrylate (TMPTMA), can be used as comonomers in relatively small amounts in the reaction mixture to improve the dimensional stability and other physical properties of the lens. Similarly, other components may be added for specific applications, for example, to impart UV absorbing properties to the lens.

The monomer reaction mixture also includes an initiator, usually from about 0.05 to 1 percent of a free radical initiator which is thermally activated. Typical examples of such initiators include lauroyl peroxide, benzoyl peroxide, isopropyl percarbonate, azobisisobutyronitrile and known redox systems such as the ammonium persulfate-sodium metabisulfite combination and the like. Irradiation by ultraviolet light, electron beam or a radioactive source may also be employed to initiate the polymerization reaction, optionally with the addition of a polymerization initiator, e.g. benzoin and its ethers.

The polymerization of the monomer reaction mixture is carried out after the mixture is contacted with the required amount of the reactive dye, and a homogeneous solution of the dye in the mixture is formed. The amount of time required to form the homogeneous solution can be readily determined empirically.

The amount of reactive dye added to the reaction mixture is an amount of dye effective to impart the desired degree of tinting or coloring to the lens. This amount can be readily determined empirically, and will depend on the thickness of the periphery of the lens, the components of the reactive monomer mixture, as well as other factors.

Preferably, the improved method of this invention is used to impart a visibility or handling tint to the lens. This is an amount which enables a wearer to visibly notice the lens during handling if temporarily misplaced, but the amount should not be such that the colored periphery of the lens is easily distinguishable from the cornea of the wearer during use. The amount of reactive dye added to the homogeneous solution before polymerization to achieve a desired visibility tint will depend significally on the purity of the dye added to the solution and therefore it should be determined empirically. Generally, it should range from about 0.01 to about 0.35 percent based on the weight of the hydrophilic monomer, preferably from about 0.01 to about 0.20 weight percent, when the dye added has at least 20 weight percent of active dye compounds. The most preferred range is from about 0.05 to about 0.15 percent.

Alternatively, the improved method of this invention offers the flexibility to impart an enhancement tint to the lens. An enhancement tint simply enhances the wearer's original eye color so that, for example, blue eyes will appear more "blue" with the enhancement tint on the lens. The amount of reactive dye added to the homogeneous solution for an enhancement tint desirably ranges from about 0.35 to about 0.75 percent based on the weight of the hydrophilic monomer, preferably from about 0.35 to about 0.50 percent, when the dye added has at least 20 weight percent of active dye compounds.

The polymerization can be carried out in the presence or absence of an inert diluent. If the polymerization is carried out in the absence of a diluent the resulting polymeric composition can be formed, as for example by lathe cutting, into the desired lens shape, and then swollen with the requisite amount of water following this operation. Alternatively, and more preferably, the polymerization is carried out in the presence of a suitable inert diluent. The preferred inert diluent is a water-displaceable boric acid ester. The characteristics of desired boric acid esters as well as the preferred concentration of ester in the polymerization reaction mixture is described in detail in U.S. Pat. No. 4,680,336, which is incorporated by reference herein. The preferred methods for forming the desired lens when a diluent is used include centrifugal casting and cast molding, for example using molds described in U.S. Pat. No. 4,565,348, as well as combinations of these methods with the other methods described generally herein.

When the polymerization reaction to prepare the lens is sufficiently complete, the lens can be hydrated to its equilibrium water content. Preferably, the water content of the lens will range from about 35 to about 80 weight percent, more preferably from about 55 to about 65 weight percent. This range is considered ideal for extended wear applications where patient comfort and handling characteristics are critical properties.

The following Example is intended to illustrate the claimed invention and are not in any way designed to limit its scope. Numerous additional embodiments within the scope and spirit of the claimed invention will become apparent to those skilled in the art.

The components used in the preparation of the contact lenses of the Example are abbreviated as follows: 2-hydroxyethyl methacrylate (HEMA), methacrylic acid (MAA), ethyleneglycol dimethacrylate (EGDMA), boric acid ester of glycerin (0.16 moles boron per mole of glycerin) (GBAE), an ethoxylated methylglucosidilaurate (MLE-80), Reactive Blue #4 [2-anthracenesulfonic acid, 1-amino-4-(3-(4,6-dichloro-s-triazin-2-yl)amino)-4-sulfoanilino)-9,10-dihydro-9,10-dioxo] (RB4) which is a dichlorotriazine dye, and $\alpha$-hydroxy-$\alpha$,$\alpha$-dimethylacetophenone (Darocur 1173) which is a UV reactive initiator. The HEMA used in all of the examples is highly purified HEMA with less than 0.1 wt % impurities.

The test methods for determining the physical and optical properties set forth in Table 1 of the Example are as follows:

Oxygen Permeability

The oxygen permeability through the lens is expressed as the Dk value multiplied by $10^{-11}$, in units of cm.ml $O_2$/sec.ml.mm Hg. It is measured using a polarographic oxygen sensor consisting of a 4 mm diameter gold cathode and silver-silver chloride ring anode.

Tensile Properties (Modulus, Elongation and Strength)

The lens to be tested is cut to the desired specimen size and shape and the cross-sectional area measured. The specimen is then attached into the upper grip of a constant rate-of-crosshead-movement type of testing machine equipped with a load cell. The crosshead is lowered to the initial gauge length and the specimen attached to the fixed grip. The specimen is then elongated at a constant rate of strain and the resulting stress-strain curve is recorded. The elongation is expressed in percent and the tensile modulus and strength is expressed in psi (pounds per square inch).

UV Transmission

This method is applicable to the determination of light transmission through the lens. A beam of light (200–800 nm) is passed through a quartz cell containing the lens in solution. The intensity of light exiting the cell is measured and ratioed against the incident (reference) beam. The values are express in % transmission.

Tint Stability

The lens is sterilized in an autoclave for 30 mins and qualitatively compared to a non-autoclaved lens for loss of tint intensity. This procedure is repeated 5 times and a lens which does not lose tint intensity passes the test.

EXAMPLE

Synthesis of Reactive Dye RB4

To a 500 ml round bottom flask is placed 350 ml of a 5% solution of $K_2CO_3$. To this is added 0.10 moles of HEMA, and the mixture is stirred for 10 minutes. To the above solution is added 0.08 mole of RB4. After the dye is fully dispersed, the temperature is raised between 40–50° C. The reaction is followed using the chromatographic HPLC method described in Hanggi et al, Analytical Biochemistry 149, 91–104 (1985), for monitoring the reaction of chlorotriazine dyes with monofunctional alcohols. Using this method, the formation of the monosubstituted monochlorotriazine—HEMA reactive dye is seen at approximately 42 minutes.

When sufficient conversion is achieved after 40–50 hours, the reaction mixture can be filtered and the filter cake collected and dried. This filter cake can be used "as is" to tint contact lenses. The filtrate can be vacuum stripped using a rotary evaporator to remove the water from the reaction product. The remaining blue powder can be used to tint lenses. The inorganics can be removed depending on the requirements of the tint. The conversion of the halotriazine can be increased by decreasing the amount of water in the reaction mixture. This would also increase the amount of the difunctional derivative of the dye.

Preparation of Tinted Contact Lens with High Water Content

The following components are mixed to form a homogeneous blend: 58.08 parts HEMA, 0.71 parts EGDMA, 0.96 parts MAA, 0.14 parts Darocur 1173. 0.07 parts of the UV-Reactive RB4 synthesized as described above, and 40 parts GBAE. The above blend is polymerized by exposure to UV light while being contained in a contact lens mold. The mold is opened after the polymerization is complete, the molded lens is submerged in either an aqueous solution of 0.50 percent MLE-80 or a 0.90% NaCl solution to which 0.50 percent MLE-80 has been added. The molds are put into the above solutions at a solution temperature between 60–70° C. The physical and optical properties of this tinted lens are shown in Table 1 as Example 1.

For comparison purposes, the physical and optical properties of an untinted lens, and a lens tinted using the conventional method, are shown in Table 1 as Control Examples A and B respectively. The untinted lens is prepared substantially identically to the method described above except no dye is used. The lens tinted using the conventional method is prepared by first soaking the untinted lens in a solution of RB4 containing 0.50 percent MLE-80, and then bonding the RB4 to the soaked lens by contact with aqueous base prior to final hydration.

TABLE 1

Physical and Optical Properties of Tinted Contact Lenses

| Properties | Example 1 | Control Example A | Control Example B |
|---|---|---|---|
| Physical Properties | | | |
| Water Content % | 60 | 60 | 60 |
| Oxygen Permeability | 28 | 26 | 28 |
| Tensile Modulus, psi | 36 | 36 | 34 |
| Elongation, % | 120 | 118 | 128 |
| Tensile Strength, psi | 32 | 35 | 34 |
| Optical Properties | | | |
| UV Transmission Minimum % | 85 | 85 | 85 |
| Tint Stability | yes | — | yes |

The results shown in Table 1 illustrate that the physical and optical properties of the tinted contact lens made according to the improved method of the invention are substantially the same as those properties for the corresponding untinted contact lens and the contact lens tinted by the conventional process.

We claim:

1. An improved method for producing a soft hydrogel contact lens having a dye dispersed substantially uniformly throughout the lens, which method comprises the steps of:

(a) reacting (i) a water-soluble mono-or dihalotriazine dye with (ii) a hydroxyalkyl ester of acrylic or methacrylic acid in the presence of a base to form a reaction product of (i) and (ii) which is a reactive dye wherein at least 50 percent of said reactive dye contains only one acrylic or methacrylic group;

(b) removing said reactive dye from unreacted said (i), (ii), and base;

(c) polymerizing a mixture comprising a solution of a hydrophilic monomer and a coloringly effective proportion of the reactive dye of step in an inert diluent to form a lens-shaped polymer swollen with said diluent; and (d) hydrating said lens-shaped polymer swollen with said diluent to replace said diluent with water; without bonding dye to the lens-shaped polymer after the lens-shaped polymer is formed.

2. The method of claim 1 wherein the mono- or dihalotriazine dye is a dihalotriazine dye.

3. The method of claim 2 wherein the dihalotriazine dye is a dichlorotriazine dye with at least one sulfonate functionality.

4. The method of claim 3 wherein the dichlorotriazine dye is 2-anthracenesulfonic acid, 1-amino-4-(3-((4,6-dichloro-1,3,5-triazin-2-yl)amino)-4-sulfophenyl)amino)-9,10-dihydro-9,10-dioxo.

5. The method of claim 1 wherein the amount of the reactive dye in said mixture of step (c) is between about 0.01 to about 0.20% based on the weight of the hydrophilic monomer so as to provide a visibility tint to the lens.

6. The method of claim 5 wherein the amount of the reactive dye in said mixture of step (c) is between about 0.05 to about 0.15 percent.

7. The method of claim 1 wherein the amount of the reactive dye in said mixture of step (c) is between about 0.35 to about 0.75 percent based on the weight of the hydrophilic monomer so as to provide an enhancement tint to the lens.

8. The method of claim 7 wherein the amount of the reactive dye in said mixture of step (c) is between about 0.35 to about 0.50 percent.

9. The method of claim 6 wherein the hydrophilic monomer is a hydroxy ester of acrylic or methacrylic acid.

10. The method of claim 9 wherein the hydroxy ester is hydroxyethyl methacrylate.

11. The method of claim 10 wherein the hydrophilic monomer includes hydroxyethyl methacrylate and methacrylic acid.

12. The method of claim 11 wherein the hydrophilic monomer includes hydroxyethyl methacrylate, methacrylic acid and ethylene glycol dimethacrylate.

13. The method of claim 12 wherein the hydrophilic monomer includes hydroxyethyl methacrylate, methacrylic acid, ethylene glycol dimethacrylate and trimethylolpropane trimethacrylate.

14. A method according to claim 1 wherein at least 80 percent of said reactive dye contains only one acrylic or methacrylic group.

15. A method according to claim 1 wherein at least 95 percent of said reactive dye contains only one acrylic or methacrylic group.

* * * * *